(12) United States Patent
Kuo

(10) Patent No.: US 7,549,246 B2
(45) Date of Patent: Jun. 23, 2009

(54) DISPLAY DEVICE

(75) Inventor: Szu-Wei Kuo, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 81 days.

(21) Appl. No.: 11/309,766

(22) Filed: Sep. 22, 2006

(65) Prior Publication Data

US 2007/0236872 A1   Oct. 11, 2007

(30) Foreign Application Priority Data

Feb. 18, 2006   (CN) .................. 2006 2 0055227

(51) Int. Cl.
*E04G 3/00* (2006.01)
*A47G 1/24* (2006.01)
*G06F 1/16* (2006.01)

(52) U.S. Cl. .................. 40/601; 248/284.1; 248/286.1; 248/287.1; 248/292.12; 248/917; 248/918; 248/919; 248/920; 248/921; 248/922; 248/923; 248/460; 361/681; 361/683

(58) Field of Classification Search .................. 361/681, 361/683; 248/460, 917–923, 284.1, 286.1, 248/287.1, 292.12
See application file for complete search history.

(56) References Cited

U.S. PATENT DOCUMENTS 5,262,762 A * 11/1993 Westover et al. ............ 345/168
6,665,175 B1 * 12/2003 deBoer et al. ............... 361/681

FOREIGN PATENT DOCUMENTS

TW   M247895   10/2004

\* cited by examiner

*Primary Examiner*—Paul N Dickson
*Assistant Examiner*—Syed A Islam
(74) *Attorney, Agent, or Firm*—Wei Te Chung

(57) ABSTRACT

A display device includes a display, a frame, and two fixing members connecting the display to the frame. The frame includes two support arms, each of the support arms defines a longitudinal sliding slot, and the display is movable along the sliding slots of the frame.

12 Claims, 5 Drawing Sheets

DISPLAY DEVICE

FIELD OF THE INVENTION

The present invention relates to a display device, and more particularly to a display device for a notebook computer.

DESCRIPTION OF RELATED ART

Portable computers, including laptop computers or notebook computers, have increased in popularity since their introduction to the electronics market. While many users prefer a tablet-type portable computer with a stylus as an input device, many other users prefer to have a portable computer with a full keyboard configuration depending upon the application for which the computer is being utilized. Therefore, users desire a portable computer that can be configured to operate either as a normal laptop computer with keyboard or pointing device input, or as a tablet computer with an electronic stylus or other touch-screen-type input device and/or OCR software. It is also generally desirable that the display of the portable computer be protected when the portable computer is being transported.

Taiwan Patent No. M247895 discloses a rotatable display for a notebook computer including a hollow frame and a display horizontally rotatably mounted within the hollow frame. Two first pivoting members are symmetrically disposed at a top frame bar and a bottom frame bar of the hollow frame respectively. Two second pivoting members are symmetrically disposed at a top portion and a bottom portion of the display respectively, and the second pivoting members are respectively pivoted to the first pivoting members of the hollow frame. However, the display can only be rotated horizontally in the frame, and it can't satisfy the user's need of adjusting a height of the display.

What is needed, therefore, is a display device which allows adjusting height of a display thereof.

SUMMARY OF THE INVENTION

An exemplary display device includes a display, a frame, and two fixing members connecting the display to the frame. The frame includes two support arms, each of the support arms defines a longitudinal sliding slot, and the display is movable along the sliding slots of the frame.

Other advantages and novel features will become more apparent from the following detailed description of a preferred embodiment when taken in conjunction with the accompanying drawings, in which:

DETAILED DESCRIPTION OF THE INVENTION

Figure 1:
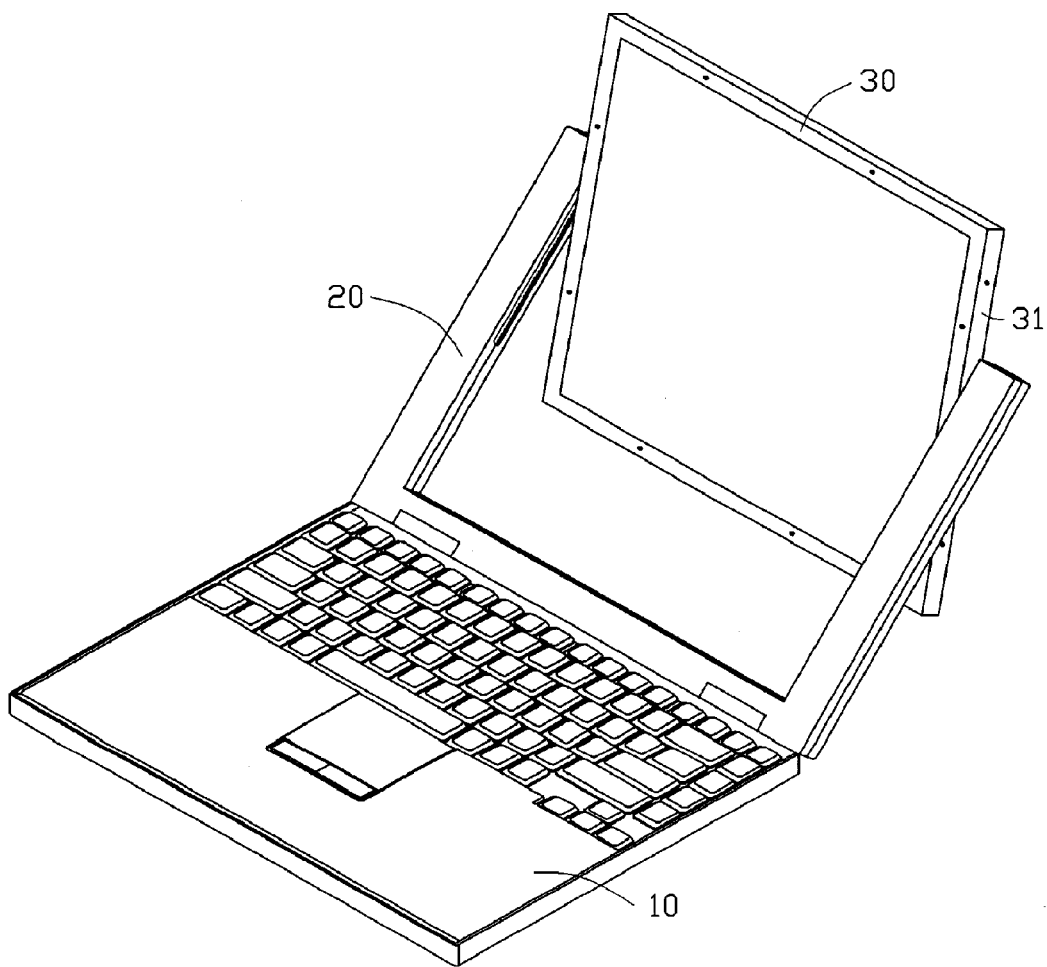
FIG. 1 is an assembled view of a display device with a base unit in accordance with a preferred embodiment of the present invention.
Figure 2:
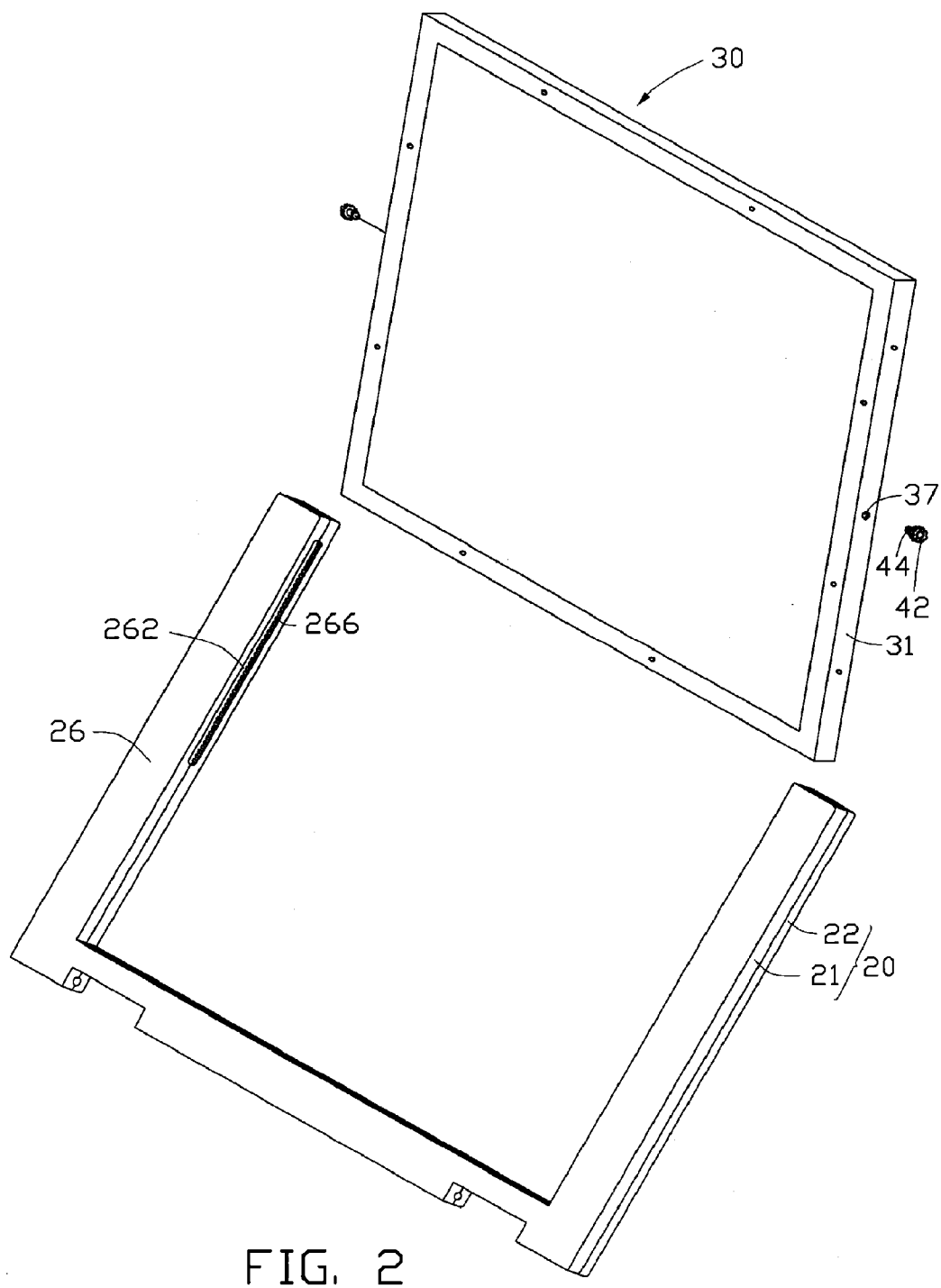
FIG. 2 is an exploded, isometric view of the display device of FIG. 1.
Figure 3:
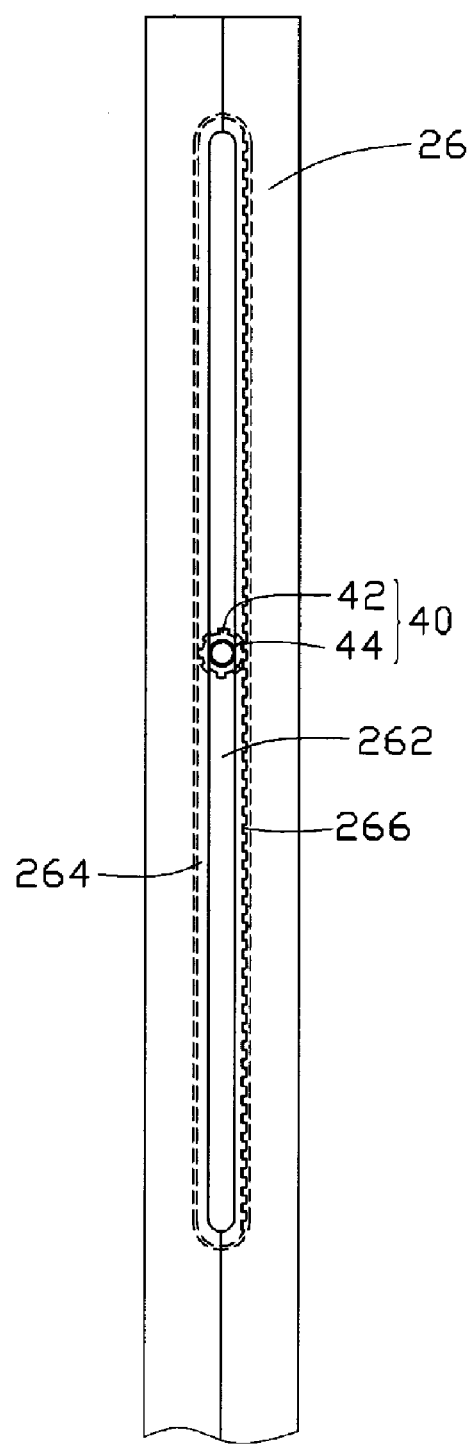
FIG. 3 is a schematic, assembled view of a gear, a pivot, and a frame arm of FIG. 2.

Referring to FIGS. 1 to 3, a display device for a notebook computer is provided in accordance with a preferred embodiment of the present invention. The display device includes a detachable frame 20 pivotally fixed to a base unit 10, a display 30, and a pair of fixing members 40.

The frame 20 includes two parallel support arms 26 each capable of being separated into two pieces 21, 22. An inside surface of each support arm 26 defines a sliding slot 262 extending from a middle portion to a top portion of each support arm 26. A wider recess 264 is defined in each support arm 26 communicating with the sliding slot 262, and a rack 266 is installed in the recess 264 of each support arm 26. In this embodiment, the rack 266 is made of rubber material.

Each fixing member 40 includes a gear 42 and a pivot 44 operatively rotatably connected with the gear 42. The pivot 44 may define a through hole therein for allowing a cable to extend therethrough. In this embodiment, the gear 42 and the pivot 44 are made of metal material. Rubber material is adhered to one end of each pivot 44 rotatably connected to a corresponding gear 42, for increasing the friction between the gear 42 and the pivot 44. Another free end of each pivot 44 forms male threads. The display 30 includes two sidewalls 31, and a middle portion of each sidewall 31 defines a threaded fixing hole 37 for fixing the free end of the corresponding pivot 44.

Referring also to FIGS. 1 and 3, in assembly, the free ends of the pivots 44 of the fixing members 40 are respectively fixed to the fixing holes 37 of the sidewalls 31 of the display 30. The frame 20 is detached into two pieces to receive the gears 42 of the fixing members 40 in the recesses 264 of the support arms 26 respectively, and the gears 42 are engaged with the racks 266 respectively. A cable, which is provided in the frame 20, is extended through the through hole of the pivot 44 to electrically connect with the display 30. The frame 20 is finally assembled, and the display 30 is movably mounted to the frame 20. Then the frame 20 is pivotally fixed to the base 10, and the cable electrically couples the display 30 to the base 10.

Figure 4:
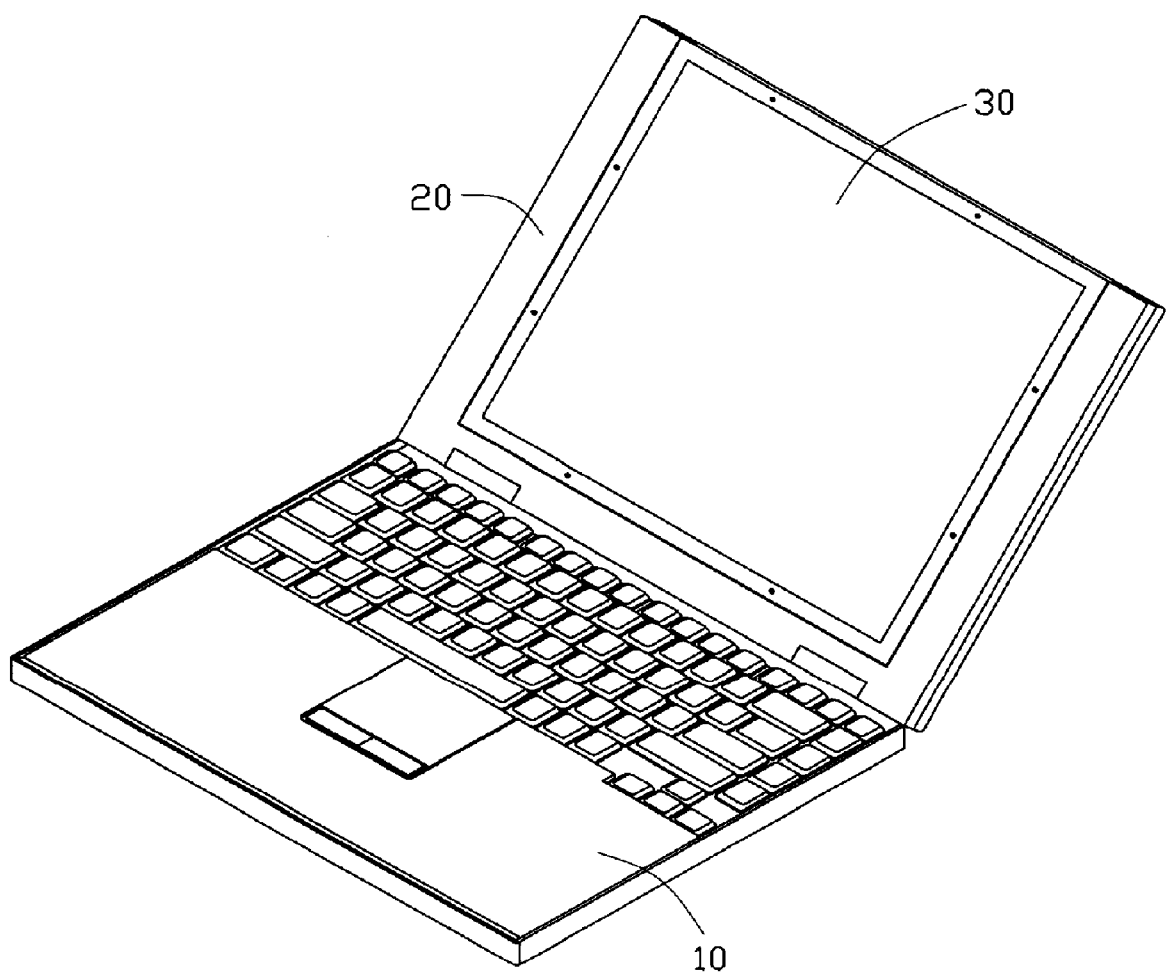
FIG. 4 is similar to FIG. 1, but showing a state of the display device used in a notebook computer.

Referring to FIG. 4, the display 30 is received in the frame 20 entirely. The display device and the base 10 are combined as a typical clamshell notebook computer. When it is desired to adjust a height and an angle of the display 30 for better view, the display 30 is pulled in a plane defined by the frame 20, causing the gears 42 to roll upwardly along the racks 266 of the support arms 26 respectively until the display 30 arrives at a desired height. The gears 42 are held in position within the corresponding racks 266 due to the friction therebetween, thereby the display 30 is held at the desired height in the frame 20. The display 30 can also be rotated to a desired angle relative to the frame 20 and held in place due to the friction between the gears 42 and the pivots 44. As shown in FIG. 1, the frame 20 is slantingly disposed relative to the base 10, and the display 30 is vertically held in the frame 20 due to the friction between the gears 42 and the corresponding racks 266 and the corresponding pivots 44.

Figure 5:
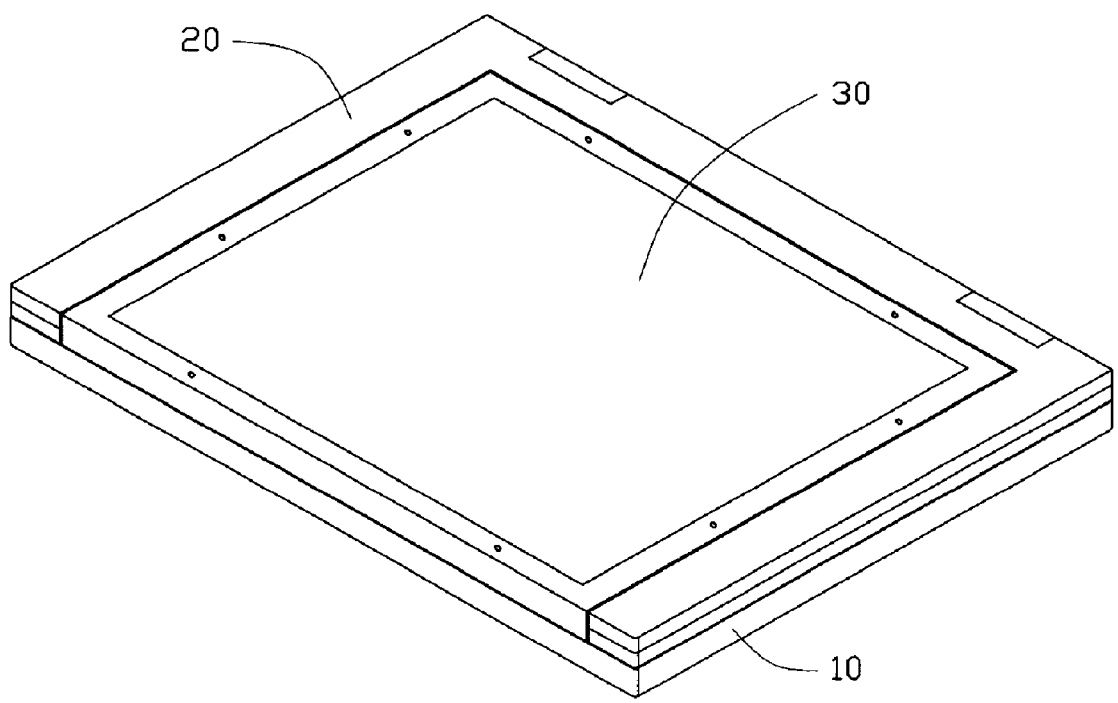
FIG. 5 is similar to FIG. 1, but showing another state of the display device used in a tablet computer.

When it is desired to transform the typical notebook computer, as shown in FIG. 4, into a tablet-type computer, the display 30 is rotated 180 degrees in the frame 20. The frame 20 is closed to the base 10, and the display device and the base 10 can be used as a tablet computer as shown in FIG. 5.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A display device comprising:
   a display;
   a frame comprising two support arms, and each of the support arms defining a longitudinal sliding slot in an inside surface thereof; and
   two fixing members connecting the display to the frame in such a manner that the display is movable along the sliding slots of the frame, wherein each of the support arms defines a recess inside a corresponding sliding slot, a rack is installed in the recess of each of the support arms, each of the fixing members comprises a gear and a pivot extending into a center of the gear to act as a pivot axis of the gear, the gear is received in the recess and directly meshes with a toothed surface of the corresponding rack, the pivot extends through the corresponding sliding slot and is connected to the display; the sliding slot and the recess of the support arms are overlapped in a direction toward the display, tranverse width of each of the sliding slots is less than transverse width of the corresponding recess, the gears received in the recesses engage with portions of the support arms bounding the sliding slots respectively in the direction toward the display, to prevent the gears disengaging from the recesses, the pivots connected to the gears are extended through the sliding slots respectively.

2. The display device as claimed in claim 1, wherein each of the sliding slots is defined from a middle portion to a top portion of the inside surface of a corresponding support arm.

3. The display device as claimed in claim 1, wherein the pivots and the gears are made of metal material, and rubber material is adhered to an end of each of the pivots rotatably connected to a corresponding gear.

4. The display device as claimed in claim 1, wherein the display comprises two sidewalls, and a middle portion of each of the sidewalls defines a fixing hole for fixing the corresponding pivot.

5. The display device as claimed in claim 1, wherein the racks are made of rubber material, the gears are made of metal material, friction between the racks and the gears is enough to hold the display at a desired position relative to the frame.

6. A display device comprising:
   a frame comprising two support arms cooperatively defining a plane;
   a display received in the plane of the frame; and
   two fixing members connecting the display to the frame, and allowing coplanar movement of the display with respect to the plane defined by the frame, wherein each of the support arms defines a recess, a rack is installed in the recess, each of the fixing members comprises a gear and a pivot rotatably connected to the gear, the gear is installed in the corresponding recess and directly meshes with the corresponding rack, the pivot is fixedly connected to a corresponding one of two sidewalls of the display, the racks are made of rubber material, the gears are made of metal material, friction between the racks and the gears is enough to hold the display at a desired position relative to the frame; a slot is defined from a middle portion to a too nortion of an inside surface of each of the support arms overlapping and in communication with a corresoonding recess in a direction toward the display allowing a corresponding pivot to extend therethrough, transverse width of the slot is less than transverse width of the corresponding recess, the gears received in the recesses engage with portions of the support arms bounding the sliding slots respectively in the direction towards the display, to the gears disengaging from the corresponding recesses of the support arms.

7. The display device as claimed in claim 6, wherein the pivots are made of metal material, and rubber material is adhered to the one end of each of the pivots rotatably connected to a corresponding gear.

8. The display device as claimed in claim 6, wherein a middle portion of each of the sidewalls of the display defines a fixing hole for fixing the another end of the corresponding pivot.

9. A portable electronic device comprising:
   a base unit;
   a display mounting frame pivotably mounted to the base unit, the display mounting frame including a pair of support arms;
   a display disposed between the support arms; and
   two fixing members each connecting one of two opposite sides of the display to a corresponding one of the support arms in a manner such that the display is slidable along a sliding slot parallel to the supporting arms, the fixing members being configured in a manner so as to allow pivoting of the display relative to the display mounting frame, wherein each of the support arms defines a recess inside a corresponding sliding slot, a rack is installed in the recess of each of the support arms, each of the fixing members comprises a gear and a pivot connected to the gear, the pivots are also connected to the display, and each gear directly meshes with the corresponding rack; the sliding slots and the recesses are defined from middle portions to top portions of inside surfaces of the support arms respectively, transverse width of each of the sliding slots is less than transverse width of the corresponding recess, the gears are received in the recesses and engage with portions of the support arms bounding the sliding slots respectively in a direction toward the display, to prevent the gears disengaging from the recesses, the pivots connected to the gears are extended through the sliding slots respectively.

10. The display device as claimed in claim 9, wherein two fixing holes are defined in middle portions of the opposite sides of the display for fixing the corresponding pivots.

11. The display device as claimed in claim 9, wherein the pivots and the gears are made of metal material, and rubber material is adhered to an end of each of the pivots rotatably connected to a corresponding gear.

12. The display device as claimed in claim 9, wherein the racks are made of rubber material, the gears are made of metal material, friction between the racks and the gears is enough to hold the display at a desired position relative to the frame.

* * * * *